J. L. WEBB.
WIND SHIELD CLEANER.
APPLICATION FILED OCT. 28, 1915.
1,184,152.
Patented May 23, 1916.
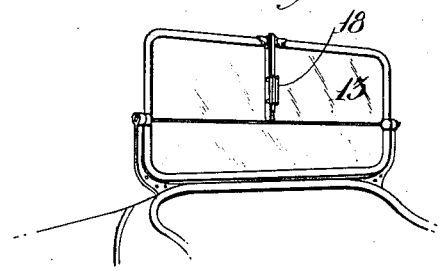
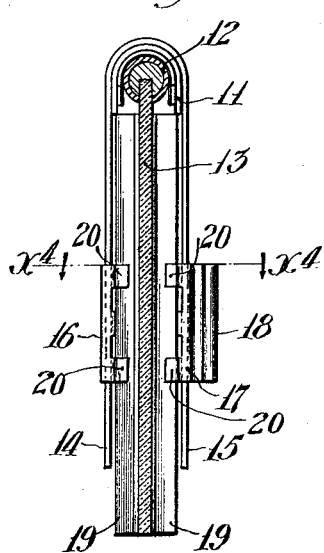
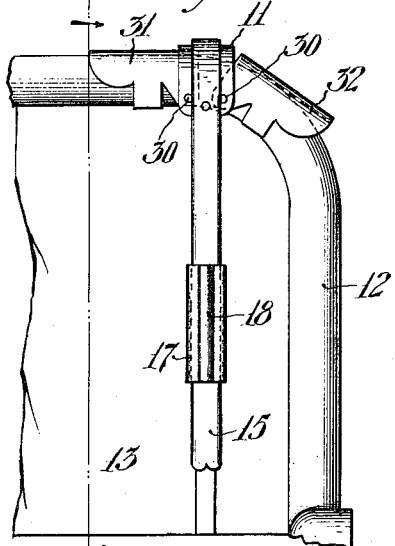
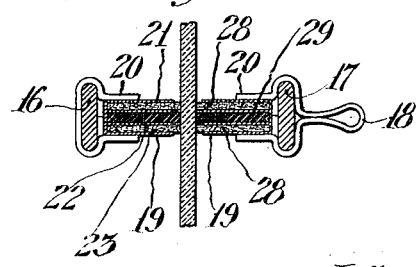
Inventor
John L. Webb
by Townsend Graham + Hair
his Attorneys ated to engage the rim of the
UNITED STATES PATENT OFFICE.

JOHN L. WEBB, OF SAWTELLE, CALIFORNIA, ASSIGNOR OF ONE-HALF TO ALICE M. STURDEVANT, OF OCEANPARK, CALIFORNIA.

WIND-SHIELD CLEANER.

1,184,152.   Specification of Letters Patent.   Patented May 23, 1916.

Application filed October 28, 1915. Serial No. 58,492.

*To all whom it may concern:*

Be it known that I, JOHN L. WEBB, a citizen of the United States, residing at Sawtelle, in the county of Los Angeles and State of California, have invented a new and useful Wind-Shield Cleaner, of which the following is a specification.

My invention relates to windshields such as are used on automobiles, and similar vehicles, for the purpose of protecting the drivers of such vehicles from the effect of wind and rain. Such windshields are commonly made of glass or similar transparent material set in a metal frame. When used in rainy or snowy weather these windshields become covered with rain or snow so that the view therethrough is greatly obstructed, and the liability to accidents, due to an improper vision on the part of the driver, is greatly increased.

The principal object of my invention is to provide a device which can be readily secured to the standard windshield by means of which snow, rain, or dust, may be readily cleaned therefrom.

In the drawings which are for illustrative purposes only: Figure 1 is a view of my invention as applied to a standard windshield, the cleaning device being shown at its central position in the act of cleaning the windshield. Fig. 2 represents, on an enlarged scale, the corner of the windshield with the cleaner in place thereon. Fig. 3 represents a cross section on a plane represented by the line $x^3$—$x^3$ of Fig. 2, this plane being viewed in the direction of the arrows. Fig. 4 represents a section on an enlarged scale, on a plane represented by the line $x^4$—$x^4$ of Fig. 3, this plane being viewed in the direction of the arrows.

The invention consists essentially of a spring guide member 11, preferably formed of sheet metal, and clamped to engage the tubular rim 12 in which the upper glass member 13 of the windshield is set. Most windshields are made in two parts as shown in Fig. 1 in which case it is only necessary to apply the cleaner to the upper half. The guide 11 has a strip forming spring arms 14 and 15 formed thereon, these arms extending on either side of the upper portion of the windshield. Wiping member holders 16 and 17 slide on the arms 14 and 15, the holder 17 having a handle 18 formed thereon as shown in Fig. 4. Wiping members 19 are placed between the ends 20 of the holders 16 and 17, the wiping members each consisting of sheet metal members clamped as shown in Fig. 4 to form three channels or grooves 21, 22 and 23. Felt members 28, and a rubber member 29 are cemented or otherwise suitably secured in the grooves 21, 22 and 23 as plainly shown in Fig. 4. The arms 14 and 15 are made with considerable spring so that the wiping members 19 are solidly pressed thereagainst. Pivoted on pins 30 to the guide 11 are wings 31 and 32, these wings being provided for the purpose of assisting in guiding the windshield cleaner as it is moved across the windshield, and being pivoted so that they will follow the grooved corners thereof to allow the windshield cleaner to be pushed practically to the edge of the glass.

The method of operation of the windshield cleaner will be obvious. It is left normally in place near one side of the windshield, and whenever it is desired to wipe off dust, rain, or snow from the windshield this can be instantly and easily done by grasping the handle 18, and sliding the windshield cleaner across the glass 13. When the windshield cleaner is so moved the felt members 28, and the rubber member 29, coöperate to scrape, or wipe, off any accumulation of foreign matter on the glass 13, thus cleaning the glass member so that a free vision may be seen therethrough.

I claim as my invention:—

1. A windshield cleaner comprising a guide adapted to engage the rim of the windshield, wings pivoted to either side of said guide, said wings engaging the rim of the windshield and being so secured to the guide that they follow the curve at the corner of the windshield, and two wiping members secured to said guide one on either side of the glass of said windshield.

2. A windshield cleaner for automobiles comprising a guide member adapted to engage and slide upon the upper tubular rim of the windshield, wings pivoted to either side of said guide, said wings engaging said upper tubular rim of said windshield and being so secured to said guide that they follow the curvature of said upper tubular rim as the windshield cleaner is pushed to the side of the windshield, spring arms rigidly secured to said guide and projecting downwardly therefrom one on either side of the glass of said windshield, and two wiping members each member being secured to one of said spring arms and being pressed against the glass of said windshield by the elasticity of said spring arms.

In testimony whereof, I have hereunto set my hand at Los Angeles, California, this 20th day of October, 1915.

JOHN L. WEBB.